United States Patent [19]

Rands

[11] Patent Number: 4,619,345

[45] Date of Patent: Oct. 28, 1986

[54] FLEXIBLE LUBRICANT APPLICATOR

[76] Inventor: Mary Rands, 3315 Villa Knolls Dr., Pasadena, Calif. 91107

[21] Appl. No.: 693,583

[22] Filed: Jan. 22, 1985

[51] Int. Cl.$^4$ .................................................. F16N 15/00
[52] U.S. Cl. .................................. 184/109; 15/104.94; 118/76; 184/20; 184/99; 401/268
[58] Field of Search ....................... 184/19, 20, 23, 25, 184/98, 99, 102, 109; 401/129, 268; 15/104.93, 104.94; 118/76, 77, 78; 222/187

[56] References Cited

U.S. PATENT DOCUMENTS

| 3,319,012 | 5/1967 | Reed et al. ............... | 15/104.93 X |
| 3,378,870 | 4/1968 | Matsunaga ................ | 401/268 X |
| 3,693,758 | 9/1972 | Tierney ................... | 184/109 X |
| 4,213,870 | 7/1980 | Loran ..................... | 15/104.94 X |

FOREIGN PATENT DOCUMENTS

| 846687 | 9/1939 | France ..... | 184/20 |
| 74670 | 7/1978 | Japan ...... | 184/98 |
| 150329 | 9/1962 | U.S.S.R. ... | 184/99 |

Primary Examiner—Leonard E. Smith

[57] ABSTRACT

A flexible lubricant applicator for forcibly applying a desired quantity of a lubricant material (such as carbon particles usually of the graphite type, particles of the Teflon type, polytetrafluoroethylene material, or the functional equivalent) to a workpiece surface which is harder than the lubricant material and usually comprising a metallic workpiece surface. It takes the form of a lubricant applicator base member provided with an outwardly extended and positioned lubricant structure and compliant lubricant mounting elements flexibly compliantly mounting same relative to the rest of the base member, with said base member being provided with movement-transmissible force-applying coupling apparatus or structure cooperable for driven engagement with respect to an externally applicable movement-causing apparatus for applying force to the base member when its lubricating structure is placed in abradable engagement with a harder surface of a workpiece, with said lubricating structure being physically softer than the surface of the workpiece adapted to be forcibly mechanically lubricated thereby through forced abrasion of the softer lubricating structure by surface irregularities present in such a workpiece surface. The entire apparatus is adapted for cooperation with a force-applying, relative-movement-causing structure or apparatus which is removably cooperable with the base member for forcibly causing relative movement of the outwardly extended lubricant mounting element (or elements) relative to a desired workpiece surface while flexibly, resiliently, compliantly forcing the lubricant structure thereagainst and, in certain forms, said force-applying structure or apparatus may be included as part of the complete inventive combination.

10 Claims, 15 Drawing Figures

FLEXIBLE LUBRICANT APPLICATOR

BACKGROUND OF THE INVENTION

The field of the invention is generally that of lubricating apparatus, structures, and materials which, in accordance with conventional prior art practice, largely comprise liquid or semi-liquid lubricating materials such as oils and/or greases or the like, and structures or apparatuses for effectively applying same, either initially or during actual operation, to workpiece surfaces which are intended to be lubricated. Sometimes, such prior art apparatuses have comprised mechanisms for moving such oil or grease to a workpiece surface and effectively applying same thereto under the action of gravity, positive feeding pressure or other equivalent applicatory procedures. There have also been a few prior art so-called "self-lubricating" or so-called "oil-less" construction which provided essential lubrication by causing the workpiece surface (such as the surface of a bearing, a journal, or other moving mechanical workpiece surface or surfaces) to be essentially porous in nature and with multiple pores thereof being initially filled with lubricant material such as oil, grease, or other functional equivalents. This type of construction in effect, is already provided with its own lubricant.

However, it should be noted that the various prior art lubricating systems, apparatuses and procedures referred to above, have certain disadvantages such as the fact that when a workpiece surface is initially placed into relative sliding contact with some other workpiece surface (such as a piston or piston rings within a cylinder of an engine, for example), at the very beginning of the relative movement, there is usually a minimum of lubrication present on the frictionally-engaged and slideably movable workpiece surfaces and this condition continues for as long a period of time as is required to bring about positive feeding of liquid or semi-liquid lubricant material onto the engaged slideably moving workpiece surfaces, which occurs only after whatever mechanism is employed for moving the lubricating oil or grease onto the slideably engaged workpiece surfaces as had time to become effective. In certain cases where the workpiece surfaces and the lubricating oil or grease are initially cold, this problem may be further aggravated and complicated, because real lubrication of the workpiece surfaces will then normally not occur until the oil or grease has been heated sufficiently to effectively reduce its viscosity to a proper magnitude for good feeding action thereof to the sliding workpiece surfaces. In the case of so-called "self-lubricating" or so-called "oil-less" lubrication, generally that is only effective for relatively low load or light duty apparatus and is limited further by the requisite porous structure required of the workpiece surfaces, which is positively precluded under certain conditions and where certain types of workpiece surfaces are employed. Furthermore, it should be noted that one of the prior art disadvantages is the fact that if one attempts to provide initial lubrication to workpiece surfaces prior to beginning to relatively move them in sliding contact with each other, the lubricating oil applied to the workpiece surfaces will tend to drain away and when relative movement of the workpiece surfaces begins after a time delay, it will be found that very little initial lubrication therebetween exists. Thus, it is clear that any improvement in the lubricating art which would make it possible to apply lubricant material to a workpiece surface in a relatively simple manner and where the lubrication would remain effective for a substantial period of time thereafter and would not become ineffective for quite a long time, relatively speaking, would be highly desirable improvement because it would virtually completely overcome the above-mentioned prior art problems and disadvantages, and it is precisely such a highly-desirable and advantageous type of lubricant applying apparatus that is provided by and in the present invention, and which further has additional advantages, which taken together with those already pointed out, virtually completely overcome most of the prior art problems, disadvantages, and limitations, with all of said advantages of the present invention flowing from and occurring by reason of the specific features of the present invention pointed out hereinafter. Probably one of the greatest uses of the present invention is in the field of pneumatics where it is desirable to keep the operating air as moisture-free and as oil-free as possible. Many small air compressors operate without oiled cylinders and rely on oil mist hopefully carried to the cylinder wall by oil grooves cut into the face of the piston. Graphite imbedded into the valleys of the cylinder-wall surface would supply lubricant (as graphite by itself is a lubricant) as well as providing a base for oil retention. Graphite or Teflon ® would also transfer to any "O" ring and would greatly reduce friction and increase operating efficiency and life. Initial break-in wear (the bedding-in process) would have the possibility of scuffing or pre-mature glazing greatly reduced by having a graphited base to begin with.

Early experimental analysis work included testing by the laboratories of SEAL (Scanning Electron Microscopic Labs) & has shown that a cylinder wall treated by this process has a coverage of over 90% carbon charted on the surface to a depth of one micron.

BRIEF SUMMARY

Generally speaking, the present invention relates to the process of dry lubricating a workpiece surface by forcibly compliantly smearing onto the surface thereof a dry lubricant material, such as graphite or Teflon (polytetrafluoroethylene) or other functionally equivalent material, and apparatus for doing so. The apparatus aspect of the invention comprises a flexible lubricant applicator for forcibly applying a desired quantity of such a dry lubricant material to a workpiece surface which is harder than the lubricant material, and which is usually of metallic construction, although not specifically so limited in all instances. The flexible lubricant applicator includes a lubricant applicator base member provided with outwardly extended and positioned lubricant means (usually a dry lubricant material such as graphite, Teflon type of polytetrafluoroethylene material, or equivalent) and with the base member and the lubricant means being effectively provided with intervening compliant lubricant mounting means flexibly compliantly mounting the lubricant means relative to the rest of the base member for effective forcible resilient compliant application of the lubricant means to a harder workpiece surface and particularly to the microfinish irregularities thereof, whereby to effectively abrade away a quantity of the lubricant means and to effectively smear it across and into minute surface recesses in the microfinish of the workpiece surface to cause a substantial amount of the dry lubricant means to adhere to any so treated area of the workpiece surface for causing it to be instantly lubricated when placed into frictional relative movement with respect to any other surface. In one representative, but non-specifically limiting form, means for facilitating the forcible resilient compliant smearing application of the lubricant means to a harder workpiece surface may comprise a what, for want of a better name, may be designated as movement-transmissible (or movement-transmission) force-applying coupling means cooperable for driven engagement with respect to externally applicable or externally applyable movement-causing means for effectively applying force to the base member when its lubricating means is placed in abradable engagement with a harder surface of a workpiece. The so-called "coupling means" must referred to may actually comprise a portion of the base member or an effective extension of a portion thereof and arranged to be either coupled to a driving tool such as a powdered drill or the like, or to the other driving means such as even the hand of an operator, in certain forms. The important point to note is that it functions for allowing driving force of any desired type to be applied to the base member, each lubricant mounting means flexibly compliantly mounted on the base member and to each lubricant means mounted on each such flexible compliant mounting means, so that any desired type of forcible resilient compliant smearing-on movement of one or more such lubricant means along a harder and surface-irregular workpiece surface can be caused to occur. This movement may be of a translatory nature, reciprocating nature, rotary nature or of any other type desired as long as it provides for a type of engagement with a workpiece surface of one or more such lubricant means of a form which might be termed "floating action" and also of a type which might be termed "independent suspension action" where each lubricant means is independently suspended and is applied under its own forcible resilient compliant "floating action" engagement with the workpiece surface such as to prevent any major surface irregularities from causing abrupt discontinuities in the engagement of the lubricant means therewith and also such as to prevent any possible breakage of the applicatory apparatus. Of course, each lubricant means is physically softer than the surface of the workpiece adapted to be mechanically lubricated thereby through forced abrasion of the softer lubricating means by surface irregularities (even of a microfinish profile type) present in such a workpiece surface.

In one form, the lubricant means is provided as an effective lubricant globule of composite construction made up of multiple laminated layers of a plastic resin matrix material (one representative form of which may comprise an epoxy resin) with each such layer being initially applied to the tip end of a corresponding flexible compliant bristle (usually of Nylon plastic material construction) and comprising the generically referred-to lubricant mounting means mentioned hereinbefore, in one representative, but non-specifically limiting version thereof. Each such plastic resin layer initially applied in liquid or semi-liquid form to each such Nylon bristle tip end is either initially provided with multiple graphite particles or is dipped into multiple graphite particles so as to become filled with such graphite particles either or both within the liquid plastic layer and on the outer surface thereof, after which, the plastic matrix is cured so as to harden with the graphite particles being firmly held in place throughout same, and/or over the surface of same. This laminating process may be employed as many times as desired in order to build up a lubricant glob (or globule) of any desired size. The initial adherence of the inner or first lamination of such plastic matrix material to the Nylon bristle tip end may be facilitated by employing an initial junction-enhancing step and/or junction-bonding or bridging material which in certain cases, may include dipping the Nylon bristle tip end in a scarifying liquid to effectively roughen the surface thereof, and using intervening junction material or bridging material having an affinity for both the Nylon material and the epoxy resin matrix material of the globule lamination which may be applied to the Nylon bristle tip end to act as a strongly adhering junction or bridge and in one representative, but non-specifically limiting form, may comprise resorcinal-formaldehyde resin adhesive material which, in one version, may be of a two-component type capable of having one component thereof applied in liquid form, usually at substantially room temperature to the exterior of the Nylon bristle tip ends and adapted to then have the second component thereof, comprising an additive, applied thereto for curing and hardening same in place followed by the application of the first or inner layer of the plastic bonding material of the first matrix lamination (usually comprising an epoxy resin) and carrying the lubricant material (such as graphite particles) over the surface thereof and/or disseminated throughout same.

In one representative form, multiple such lubricant globules mounted on multiple such Nylon bristles may be carried by the base member to effectively assume a dry lubricant applicatory brush-like configuration suitable for powered application to a workpiece surface, but various other configurations and mounting structures also lie within the scope of the invention.

OBJECTS OF THE INVENTION

With the above points in mind, it is an object of the present invention to provide a novel dry lubricant "floating action", "independent suspension" type of dry lubricant applicatory means for applying a desired quantity of dry lubricant to a harder workpiece surface.

It is a further object of the present invention to provide apparatus of the character referred to in the preceding object, wherein multiple globules of dry lubricant material are resiliently and compliantly mounted on corresponding flexible compliant bristle tip ends of an applicatory dry lubricating brush (or functionally equivalent compliant mounting means) and which can be applied to any type of workpiece surface harder than the lubricant means but which is particularly suitable for operation in a self-centering manner with respect to curved or cylindrical workpiece surfaces, and especially with respect to such workpiece surfaces which are inside surfaces.

It is a further object to provide dry lubricant applicatory means of the type referred to herein embodying any or all of the features referred to herein, either individually or in combination and wherein the construction is of a type requiring relatively low cost manufacturing operations to produce same in volume—low cost both as to initial capital costs for tooling, etc., and low cost as to the actual manufacturing cost per unit produced—all such as to facilitate the widespread production, sale, and use of the present invention for the purposes outlined herein or for any other substantially functionally equivalent purposes.

It should be understood that the figures and the specific description thereof set forth in this application are for the purpose of illustrating the present invention and are not to be construed as limiting the present invention to the precise and detailed specific structures shown in the figures and specifically described hereinbefore. Rather, the real invention is intended to include substantially equivalent constructions embodying the basic teachings and inventive concept of the present invention.

For the purpose of clarifying the nature of the present invention, several exemplary embodiments of the invention are illustrated in the hereinbelow-described figures of the accomanying drawings and are described in detail hereinafter.

BRIEF DESCRIPTION OF THE DRAWING FIGURES

FIG. 1 is a three-dimensional, oblique, pictorial isometric view illustrating the embodiment of the flexible lubricant applicator of the present invention, representative of multiple forms thereof lying within the scope of the present invention and wherein it essentially comprises a flexible lubricant applicator brush having a plurality of lubricating globules essentially exemplifying one form of the lubricant applicator concept of the present invention mounted on a plurality of flexible compliant mounting shafts taking the form of Nylon bristles in the representative arrangement illustrated whereby to provide a lubricant applicator which can be applied in a forcible compliant manner to any workpiece surface for dry-lubricating same, but which is particularly suitable for lubricating interior curved or cylindrical surfaces by effectively smearing a desired quantity of dry lubricating means thereon.

In other words, FIG. 7 may be said to be a view largely of a diagrammatic and schematic nature illustrating entirely schematically the next step in the formation of a representative lubricating globule, comprising the curing-in-place of the various successively outwardly adjacent layers of the epoxy resinoid matrix material (and the absorbed particles of dry lubricant material carried thereby) in addition to the inner initial bridging or junction layer, provided by the application of curing heat of a desired type and having desired characteristics, and indicated entirely diagrammatically and/or schematically in this view because such curing, heat-applying apparatus is well-known in the art.

FIG. 8 is a view similar to FIG. 5, but illustrates the application of additional laminations over the first laminated structure shown being cured in place in FIG. 6, and in this view, it will be seen that additional layers of the plastic resinoid matrix material has been exteriorly applied thereto each to be followed immediately by the application of additional particles of dry lubricant material which is absorbed into the matrix material until saturated in a manner similar to the showing of FIG. 6 and each lamination being cured in a manner similar to the showing of FIG. 7, thus, showing the sequence of building up as many laminations as desired or as needed to produce a lubricating globule of the type shown in FIG. 2 and of as large a size as is desired or needed and with as many laminations as desired or needed.

In other words, FIG. 12 is a three-dimensional perspective view of a flexible dry lubricant applicator in accordance with the teachings of the present invention, but wherein the applicator assumes a different physical construction having a slightly modified base in each case and an extended handle connected thereto suitable for driven cooperation with either a powered machine, or a person's hand, or any other functional equivalent suitable for such power-applying purposes.

FIG. 14, are of similar types, but show different relative carbon and iron contents based on different initial conditions of the treated workpiece surfaces. In other words, the two views effectively illustrate that under various initial surface conditions of a workpiece surface to be effectively lubricated by the novel flexible lubricant applicator of the present invention, the end result is very effective as is evidenced by the relatively high carbon content shown in both FIG. 13 and in FIG. 14.—said high carbon content being the dry lubricating graphite particles which have been effectively smeared onto the treated surface of the workpiece by the novel type of independently suspended effective floating flexible action mounting and operation of the novel flexible dry lubricant applicators of the present invention.

FIG. 13 corresponds to the type of surface shown diagrammatically and schematically in FIG. 10 and corresponds to either a workpiece surface which is initially "peaky", but has been flexibly honed down somewhat so that the multiple initial peaks thereof are now topped by corresponding small plateaus—in other words,—a relatively fully-plateaued and relatively "non-peaky" finish.

In FIGS. 13 & 14, the elements carbon and iron, and certain of the other elements found to be present, are indicated by the closely-positioned usual chemical symbols for said elements.

DESCRIPTION OF THE PREFERRED EMBODIMENTS

Generally speaking, the flexible lubricant applicator of the present invention comprises a lubricant applicator base member, one representative form of which is indicated generally at 20 (best shown in FIG. 1) and which is provided with outwardly extended and positioned lubricant means, one exemplary form of which is generally designated by reference numeral 22, and further provided with compliant lubricant mounting means, such as is generally designated at 24, flexibly compliantly mounting each corresponding lubricant means 22 relative to the base member 20. In the example illustrated, each of said lubricant means 22 takes the form of a lubricating globule, also generally designated by the reference numeral 22, and best shown in FIG. 2 in fully-detailed form.

In the exemplary form illustrated, each of the above-mentioned compliant lubricant mounting means comprises a flexible bristle shaft, also designated by the reference numeral 24 and, in the example illustrated each of same is illustrated as being formed of nylon plastic material, although other appropriately compliant materials may be employed in lieu thereof. Also, in the example illustrated, the arrangement of the plurality of compliant Nylon bristle shafts 24 and the plurality of lubricating globules 22 at their outer ends is such relative to the base member 20 as to effectively form a flexible lubricating brush generally designated by the reference numeral 26.) In the example illustrated, the mounting bristles 24 and the lubricating globules 22 are mounted in a circular array (which in certain forms, may along the outer periphery thereof, simulate a closeknit helix or multiple such effectively interwoven so that one can follow a spiral encircling line from globule to globule around the outer periphery of the complete lubricating brush 26.) This partially follows from the mode of construction of the brush, particularly as to the mode of attachment of inner ends of the compliant flexible bristles 24 relative to the central longitudinal base member 20 which, in the representative form shown, comprises passing longer or effectively double lengths of the Nylon bristle material through and between the wires 28 of which the representative base member 20 is formed and doing so prior to tightly twisting said base member wires 28 into the tightly twisted configuration shown in FIG. 1. This firmly engages middle parts of the double lengths of Nylon bristle material and in effect, causes the previously-mentioned helix simulating outer peripheral arrangement of the bristles and the lubricating globules 22 carried at the outer ends thereof. However, while this construction is convenient and effective, the invention is not specifically so limited and the flexible compliant lubricant mounting means (bristles, in the example illustrated) can be both positioned and structurally mounted in a number of other ways, some generally similar, and some quite dissimilar from the representative showing of FIG. 1—and all within the broad scope of the present invention.

Figures 1, 2, 3:
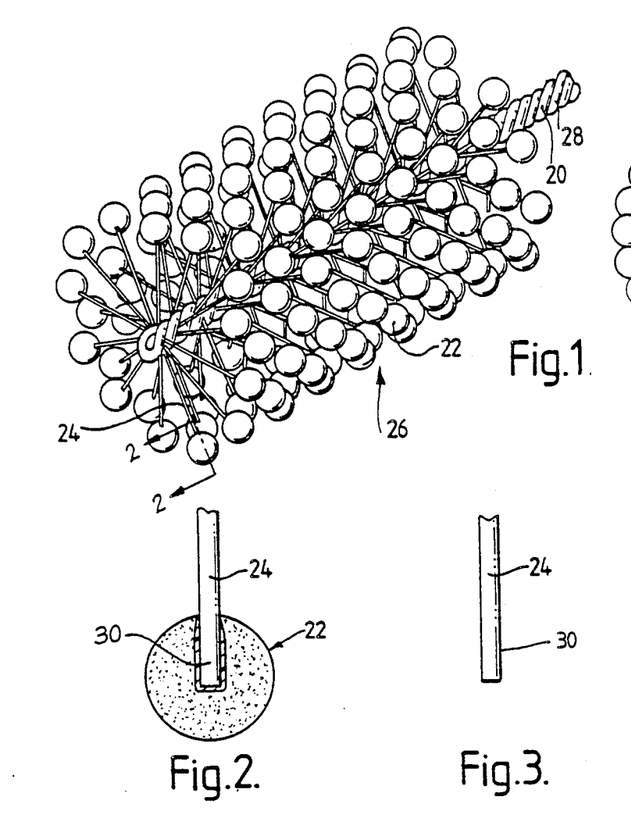
FIG. 2 is a fragmentary partially broken away and greatly enlarged cross-sectional view of one representative one of the plurality of lubricating globules shown in FIG. 1, as indicated by the arrows 2—2 of FIG. 1. It shows one representative type of lubricating globule which the flexible lubricant applicator of the present invention may comprise.
FIG. 3 is an enlarged fragmentary view illustrating an initial step in the construction of the representative lubricating globule shown in detail in FIG. 2, and in this view, only a bristle tip end, preferably of a Nylon bristle, is shown prior to the first stage of construction of a lubricating globule firmly mounted thereon.
Figure 1A:
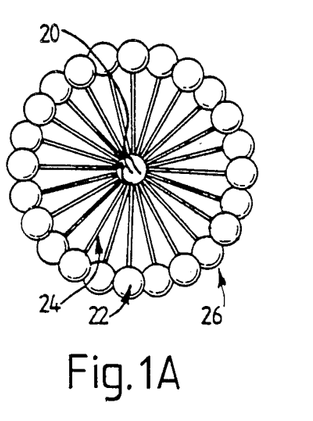
FIG. 1A is an end elevation of FIG. 1.

The representative, but non-specifically limiting type of lubricating globule 22 shown exteriorly in FIG. 1 in a multiple flexibly mounted assembly thereof, can be made in any of several different ways. However, one representative procedure of said several different manufacturing processes is illustrated sequencially and somewhat diagrammatically and in simplified form in FIGS. 2 through 8 and as illustrated therein, it should be noted that each nylon bristle 24 has its bristle tip end 30 initially scarified (effectively roughened and rendered more porous) before the building up and curing-in-place of a desired number of laminations or layers, each carrying dry lubricant material softer than a workpiece surface, occurs or is accomplished, such as is described hereinafter in one representative form.

One particular type of high-density nylon which is very effective for use in forming the bristles 24 is a type known in the trade as 6-10, 6-12, or 6-06 nylon which is relatively surface-impervious to water and many chemicals and which has an almost waxy outer surface to which it is difficult for most resinoid matrix materials to form a firm adhering bond. This has been found to be true with one preferred type of the resinoid matrix plastic material wherein it comprises an epoxy resin. Therefore, under these conditions, and when these two types of materials are used, the optional above-mentioned scarifying step has been found to be advantageous. One such scarifying material is a resorcinol derivitive, which has been found to attack the outer layer of the nylon bristle tip 30 such as is shown in FIG. 3. After dipping or otherwise applying such a scarifying resorcinol derivitive material to a desired length portion of just the bristle tip 30 of each nylon bristle 24 so as to produce such bristle tip scarification or surface roughening of the bristle tip end (in certain cases, with the effect reduced by dilution of the resorcinol derivative with water), the scarified bristle tip end 30 is then dried, often by the application of drying heat in a manner generally similar to that shown in FIG. 7, such as by using a curing box of well-known construction, and usually at a temperature of between 100° to 125° for about twenty to twenty-five minutes, although not specifically so limited. In certain instances, the initial scarifying treatment is again repeated and a second coating of resorcinol material and is low-temperature cured in the same fashion as the first-mentioned application or step. The layer of resorcinol material may be said to comprise an effective bridging or junction layer 32 as specifically indicated in FIG. 4 and may be said to have an affinity for both the nylon material of the inner bristle tip end 30 and a resinoid plastic matrix material which will be applied thereto in the next step as indicated in FIG. 5, and wherein said plastic matrix material is designated by the reference numeral 34.

Figure 4:
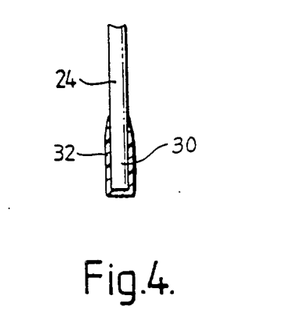
FIG. 4 is a view generally similar to FIG. 3, but shows the fragmentary bristle tip end of FIG. 3 after completion of a first representative lubricating globule-forming operation and comprising the initial treatment and positioning of effective bridging junction material on the Nylon bristle tip end for enhancing the subsequent attachment of the rest of the lubricating globule of FIG. 2 thereon and in a manner vastly superior to the direct joining of the lubricant globule to the Nylon bristle tip end without such intervening bridging junction material as shown in FIG. 4. This primary bridging material is then fully heat-cured.
Figure 5:
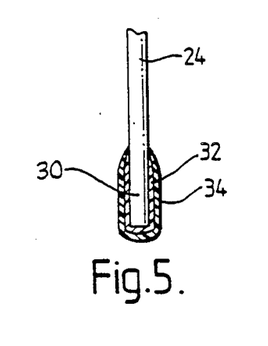
FIG. 5 is another fragmentary view similar to FIG. 4, but illustrates the next step in the formation of the lubricating globule and comprising the application to the bridging junction material of FIG. 4 of resinoid matrix material, often an epoxy resin, which will carry dry lubricant particles adhered thereto and in certain cases, disseminated therethrough.

The bristle tip end 30 of FIG. 4, as just referred to above, next is coated with the resinoid type plastic matrix material 34, which, in one preferred form, is an epoxy resin. This can be of several different types, but one exemplary form comprises a three-part epoxy resin wherein two of the parts are mixed prior to preparing same for application to the bristle tip end 30 and wherein the third part is a curing activator, with all of the three constituents being of appropriate composition and mixture such that each layer or lamination (including all subsequent layers and laminations) can each be cured in a low-temperature curing box, or otherwise by the application of curing heat at approximately 185° during approximately a thirty-minute curing period, although not specifically so limited.

Figure 6:
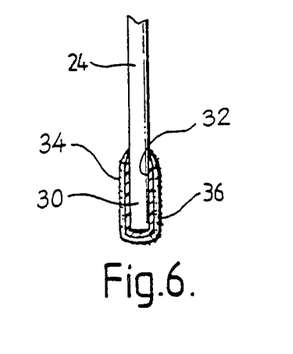
FIG. 6 is another view similar to FIG. 5 but shows multiple particles of dry lubricant material disseminated throughout the layer of the three-part epoxy material and also carried on the surface thereof.

The next step (or in certain cases, part of the same step), comprises the application to the still-liquid resinoid matrix material 34 of a plurality of dry lubricant particles such as shown at 36 in FIG. 6. These dry lubricant particles 36 may comprise graphite particles, teflon type of polytetrafluoroethylene material, or other functional dry lubricant equivalent which is softer than a workpiece surface which is to be lubricated thereby. As illustrated in FIG. 6, the dry lubricant particle application step may involve dipping, rolling and movement of various applicatory types of the still-wet epoxy resin matrix material 34 into a quantity of particles of the dry lubricant material 36 until said particles have entered into and/or adhered to the surface of the still-liquid epoxy resin matrix material 34 to any desired extent, or the mixing of the dry lubricant particles 36 with the liquid epoxy resin matrix material 34 may be done before the application of the composite material to the scarified bristle tip end 30 of FIG. 4. In either case, the result is generally similar to the representative showing of FIG. 6.

Figure 7:
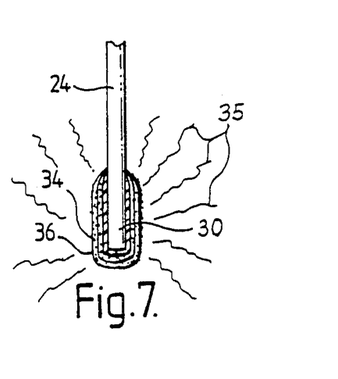
FIG. 7 is another view illustrating the next step in the formation of a representative lubricant globule comprising the curing in place of the initial bridging or junction layer and the next successively outwardly adjacent layers of epoxy material and the absorbed particles of dry lubricant material carried thereby which have been heat cured in a curing box. (Not shown.)

Next, the composite layer of still-liquid epoxy resin matrix material 34 and dry lubricant particles 36 carried thereby are cured in place in a low-temperature (usually above ambient temperature) curing operation as described hereinbefore by insertion into a heated region (curing box, or the like) and subjected to curing heat 35 as indicated in FIG. 7 where it can be cured until completion of the initial lamination curing operation has occurred. As previously mentioned, this may occur in one exemplary, but non-specifically limiting form of the invention after approximately thirty minutes of curing time while being subjected to approximately 185° within a curing box or functional equivalent.

Figures 8, 9:
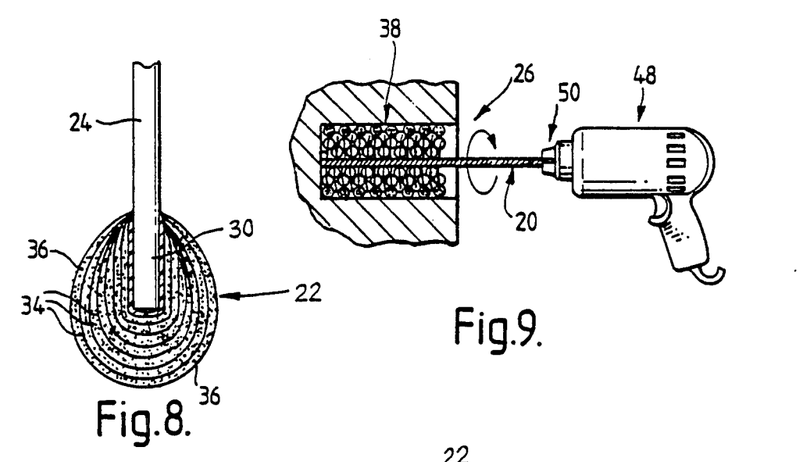
FIG. 9 illustrates the application of the flexible lubricant applicator brush of FIG. 1 to a substantially curved workpiece surface (shown fragmentarily) and is intended to be representative of the application thereof to a workpiece surface of any desired configuration provided that it is harder. than the lubricant globules and the dry lubricant particles carried by the lubricant globules.

FIG. 8 illustrates the next step which merely comprises the application to the cured partially built-up globule 22 of FIG. 6, after curing as shown in FIG. 7 of another layer of the plastic epoxy resin matrix material 34, followed by the application thereto while still in liquid state of another quantity of the dry lubricant particles 36, all of which are then to be low-temperature cured by repeating the initial curing operation shown in FIG. 7.

It is to be understood that each of the final lubricating globules 22 of the dry lubricant brush 26 of FIG. 1 comprises a multiple layer or multiple lamination globule similar to that just referred to in connection with the description of FIG. 8, except for the fact that it may comprise more (or less) layers or laminations than the several illustrated in FIG. 8. Indeed, as many laminations or layers as desired and as corresponds to the desired globule size, can be produced by merely repeating the operations illustrated in detail in FIG. 2 through 8 and described hereinbefore.

Figure 10:
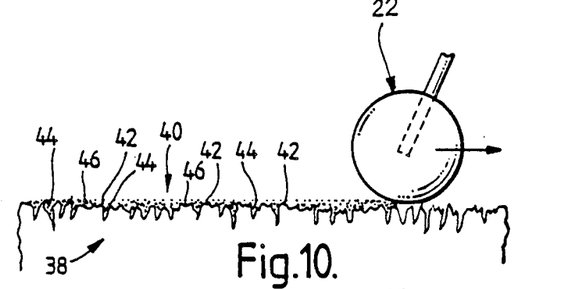
FIG. 10 is a greatly enlarged fragmentary microprofile type of cros-section of a portion of the workpiece surface when it is of an idealized "plateaued type" (where the microprojections have had their tip ends abraded away to provide same with flat tops spaced by crevices and valleys therebetween) and shows the filling in of crevices and valleys with the smeared-on dry lubricant material produced by the use of the flexible lubricant applicator of the present invention.

FIG. 9 illustrates the application of the flexible lubricant applicator brush 26 of FIG. 1 to a workpiece surface 38, which application is a resilient forcible and relatively moving application so that the workpiece surface 38, which is harder than any portion of each lubricating globule 22 and, especially, harder than the dry lubricant particles 36, will cause the workpiece surface 38 to abrade away globule portions 22 comprising parts of the plastic resinoid matrix material 34 and multiple dry lubricant particles 36, or portions thereof, which will not only be abraded away from each lubricating globule 22, by the harder workpiece surface 38, but will be effectively smeared and applied in an adhering manner across the workpiece surface 38 so as to effectively comprise a lubricating coating, indicated generally at 40 in FIG. 10, thereon.

As is best illustrated in FIG. 10, an enlarged micro-profile cross-section of the workpiece surface 38 shows that when it is of an idealized "plateaued type", it comprises multiple microprojections 42 effectively spaced from each other by crevices and/or valleys 44, with the tip ends of the microprojections 42 having been previously abraded away to provide same with flat tops 46. This view shows that the abraded-away combination of plastic matrix material 34 and dry lubricant particles 36 have been effectively smeared into the crevices and valleys 44 so as to either partially or in some cases, almost fully fill same, or somewhat more than doing so. This filling material comprises the previously-referred to effective dry lubricant coating 40, which has been applied to the workpiece surface 38 and is effectively adhered thereto so that workpiece surface 38 is effectively fully lubricated and ready to provide full lubrication upon its first frictional contact with any other surface or object.

Figure 11:
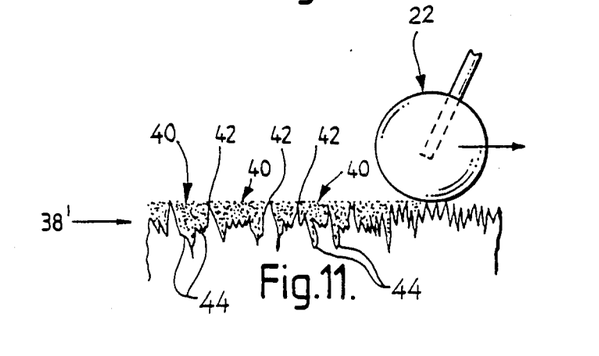
FIG. 11 is a view similar to FIG. 10, but shows a fragmentary microprofile workpiece surface section where it is of the so-called "peaky" type (not plateaued, in the manner of FIG. 10) and shows that it also has intervening crevices and valleys filled in with smeared-on softer dry lubricant material produced by the use of the present invention.

FIG. 11 is a view very similar to FIG. 10 but merely shows a fragmentary microprofile workpiece surface section 38′ which is not plateaued in the manner of FIG. 10, but is of the so-called "peaky" type so that each microprojection 42 does not have its top abraded away to form a flat top such as shown at 46 in FIG. 10. This view shows the intervening crevices or valleys 44 filled with the smeared-on dry lubricant material coating 40 in a manner similar to the showing of FIG. 11.

Each dry lubricant globule 22 must be provided with means to allow it to be compliantly forced against and relatively moved with respect to the workpiece surface 38 and, in the dry lubricant applicatory brush form 26 of the present invention, the base member 20 may be employed for this purpose by manually grasping and forcibly applying and relatively moving same, and, therefore, said base member 20 may be said to effectively comprise one representative, but non-specifically limiting form of force-applying coupling means cooperable for driven engagement, which may be accomplished by any of various forms of externally applicable movement-causing means (such as a hand, drill-motor chuck, or equivalent.)

For example, an electric drill motor, such as is shown at 48, and a chuck such as is shown at 50, may be employed in the manner shown in FIG. 9, or in any equivalent manner for this purpose, or other power means or even hand application may be employed for this purpose.

Figure 12:
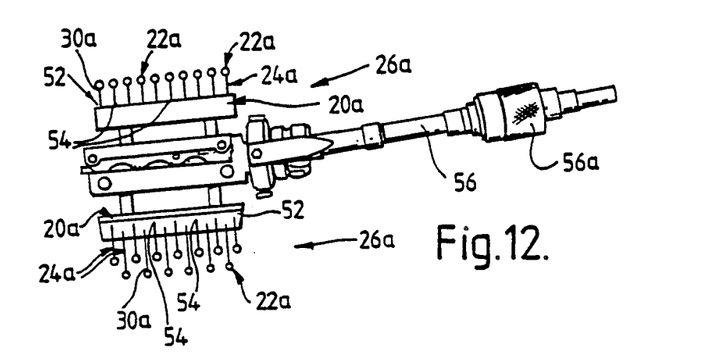
FIG. 12 is a view somewhat similar to FIG. 1, but illustrates a different construction for the flexible mounting means and is representative of multiple forms thereof within the scope of the present invention.
Figure 13:
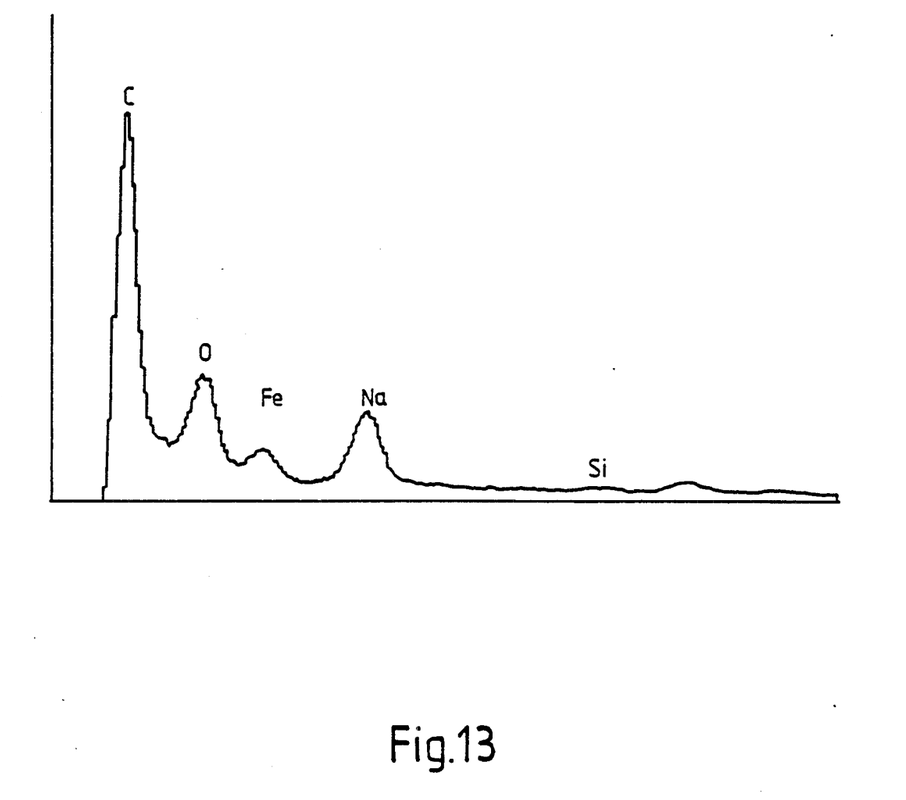
FIG. 13 is a chart of graph made by electroscopic scanning (electron-microscope-scanning) analysis of a sample workpiece surface to a one micron depth, showing, particularly, the carbon content and iron content of the surface for the purpose of bringing out the novel dry lubricating characteristics of the present invention brought about by the effective flexible independent suspension, low-velocity, low-contact pressure (flexible) of the novel flexible lubricant applicator of the present invention. This view, and the subsequent view.
Figure 14:
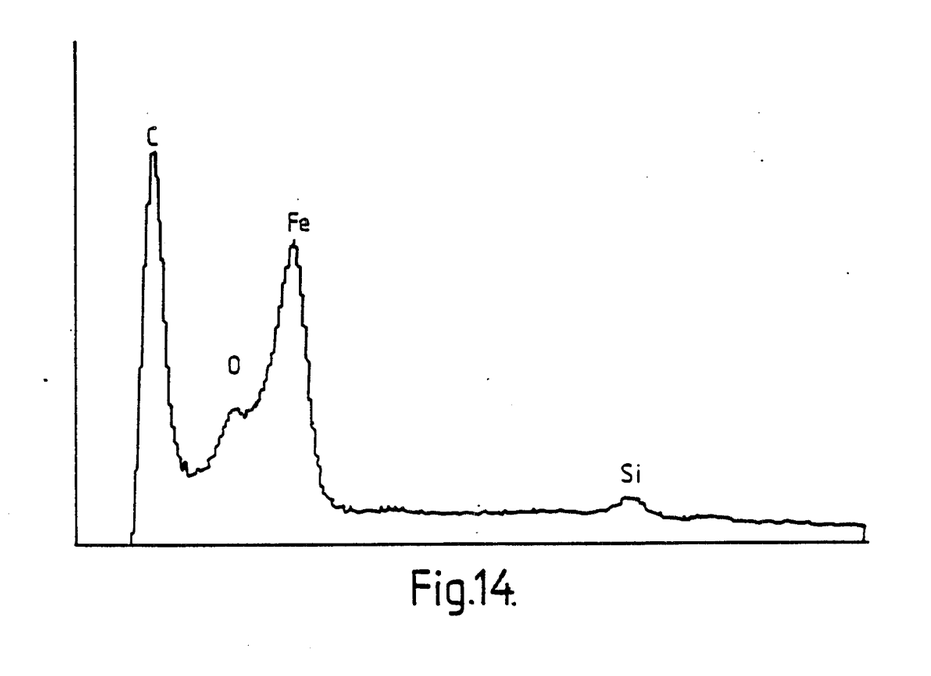
FIG. 14 is a view similar to FIG. 13, but corresponds to FIG. 11 and shows that even with a somewhat more "peaky" workpiece surface of the FIG. 11 type, the dry lubricated operation thereon produces a high carbon (graphite) surface content to the 1 micron depth measured and the only real difference is the fact that the chart or graph of FIG. 14 shows a higher relative percentage of iron present in the finished dry lubricated surface of the FIG. 11 type, as compared to the showing of FIG. 13 corresponding to the more plateaued surface shown in FIG. 10. This is because the iron-containing peaks of a so-called "peaky" finish or partially or slightly plateaued finish are present and constitute a higher relative percentage than would otherwise be the case in a more plateaued finish of the FIG. 10 type as graphed in FIG. 13.

FIG. 12 shows an alternative embodiment, exemplary only of one of many forms which the force-applying coupling means may take. In this modification, parts corresponding to those shown in the first form of the invention are indicated by similar reference numerals, followed by the letter "a". The major change in the FIG. 12 embodiment is the fact that it has longitudinal base members 20a, with each such base member having a mounting surface 52 which carries compliant mounting bristles 24a in generally similarly and adjacent outwardly directed relationship, rather than in the cylindrical array shown in FIG. 1. Thus, each modified dry-lubricant-applying brush means 26a is substantially a one-sided brush and in the form illustrated, the rear ends 54 of the nylon bristles 24a are carried by the surface 52 of the corresponding base member 20a by being effectively imbedded therein. This may be accomplished in any of several different ways, either before or after the forming of the base member 20a, itself, such as by being effectively molded in place or such as by being effectively affixed to the base, as by being cemented or otherwise attached thereto, in certain cases, in mounting holes provided in the corresponding surface 52 of the base member 20a, or otherwise. The several brush means 26a are carried by a shaft 56 and are manually expandable outwardly therefrom to the position shown, by movement of a knurled wheel 56a in the example illustrated.

In any event, the outer bristle tip ends 30a carry dry lubricant globules 22a in a manner similar to that previously described and illustrated. However, in this embodiment, the previously-mentioned coupling means, which comprised the extended end 20 of the base member in the first embodiment of the invention, now takes the form of the shaft 56 which comprises a handle suitable for manual grasping or for engagement by any suitable kind of power tool for compliantly forcibly applying the globules 22a to a somewhat harder workpiece surface. For example, the shaft 56 may be manually grasped for such applicatory purposes, or it may be clamped in a reciprocating power tool and then applied to the harder workpiece surface so that powered reciprocating movement can be employed for applying dry lubricant across the harder workpiece surface.

It should be noted that throughout this specification, the primary form of dry lubricant particles, such as shown at 36 in the exemplary first form of the invention, are disclosed as being graphite particles which are particularly suitable for such dry lubrication of a workpiece surface as is clearly shown in FIGS. 10 & 11. However, the invention is not specifically so limited, and said dry lubricant particles 36 may comprise particles or beads of teflon type of polytetrafluoroethylene material, or any other material softer than a workpiece surface which is to be lubricated and characterized by lubricating qualities.

It should also be noted that while each lubricating globule 22 of the representative first form of the invention illustrated is shown as being of laminated multi and sequentially cured layer type construction, and while this constitutes one highly-efficient and preferred form of the invention, the invention also is intended to include other effectively equivalent constructional arrangements where a binder or matrix material holds a dry lubricant material and mounts same in a compliant manner and where the binder material and the dry lubricant material are both softer than the surface of a workpiece which is to be dry lubricated. This concept, in certain forms, may be achieved without laminations, and in certain cases even without the brush-like construction involving multiple bristles, provided merely that equivalently compliant mounting of the soft binder-held soft dry lubricant particles is achieved in the composite flexible lubricant applicator construction, and all such are intended to be included and comprehended herein. This also applies to the use of nylon for the bristle material and epoxy resin for the matrix material, which may be replaced by effectively functionally equivalent counterpart materials in the two exemplary forms of the invention illustrated, or in other modifications thereof.

Also included within the scope of the invention is another form where the bristles and lubricating globules are replaced by elongated bricks or blocks, functionally equivalent thereto, and an expanding tool somewhat similar to the showing of the FIG. 12 embodiment, which bricks or blocks are of graphite, teflon, or other functionally equivalent solid dry lubricant material softer than a workpiece and effectively flexibly mounted by the base structure.

It should be understood that the figures and the specific description thereof set forth in this application are for the purpose of illustrating the present invention and are not to be construed as limiting the present invention to the precise and detailed specific structures shown in the figures and specifically described hereinbefore. Rather, the real invention is intended to include substantially equivalent constructions embodying the basic teachings and inventive concept of the present invention.

What is claimed is:

1. A flexible lubricant applicator for forcibly applying a desired quantity of a lubricant material to a workpiece surface, harder than the lubricant material, comprising: a lubricant applicator base member provided with outwardly extended and positioned lubricant means and compliant lubricant mounting means flexibly compliantly mounting same relative to the rest of said base member; said base member being provided with movement-transmissible force-applying coupling means cooperable for driven engagement with respect to externally applicable movement-causing means for applying force to said base member when its lubricating means is placed in abradable engagement with a harder surface of a workpiece, said lubricating means being physically softer than the surface of a workpiece adapted to be forcibly mechanically lubricated thereby through forced abrasion of said softer lubricating means by surface irregularities present in such a workpiece surface; said lubricant means comprising an outer plurality of spaced lubricating globules provided with and being affixed to outer ends of said flexible compliant lubricant mounting means.

2. A flexible lubricant applicator as defined in claim 1, wherein said lubricant means comprising said outer plurality of said spaced lubricating globules provided with and being affixed to said outer ends of said flexible compliant lubricant mounting means takes the form of a corresponding plurality of flexible outwardly projecting compliant mounting shafts having inner ends affixed to a central portion of said base member.

3. A flexible lubricant applicator as defined in claim 1, wherein said lubricant means comprising said outer longitudinally and circumferentially spaced plurality of said spirally arranged lubricating globules provided with and being affixed to said outer ends of said flexible compliant lubricant mounting means takes the form of a corresponding plurality of flexible outwardly projecting compliant mounting shafts having inner ends affixed to a central portion of said base member, and thus compositely comprising a flexible lubricating brush.

4. A flexible lubricant applicator as defined in claim 1, wherein said lubricant means comprising said outer plurality of said spaced lubricating globules provided with and being affixed to said outer ends of said flexible compliant lubricant mounting means takes the form of a corresponding plurality of flexible outwardly projecting compliant mounting shafts having inner ends affixed to a central portion of said base member, at least certain of said lubricating globules comprising quantities of solid lubricating material provided with, carried by, and cured-in-place in and on the surface of a body of matrix material.

5. A flexible lubricant applicator as defined in claim 1, wherein said lubricant means comprising said outer plurality of said spaced lubricating globules provided with and being affixed to said outer ends of said flexible compliant lubricant mounting means takes to form of a corresponding plurality of flexible outwardly projecting compliant mounting shafts having inner ends affixed to a central portion of said base member, at least certain of said lubricating globules comprising quantities of solid lubricating material provided with, carried by, and cured-in-place in and on the surface of a body of matrix material, each globule comprising a plurality of successive cured-in-place matrix material layers forming a composite cured-in-place lubricating globule of virtually any desired size suitable for the intended lubricating usage thereof.

6. A flexible lubricant applicator as defined in claim 1, wherein said lubricant means comprising said outer plurality of said spaced lubricating globules provided with and being affixed to said outer ends of said flexible compliant lubricant mounting means takes the form of a corresponding plurality of flexible outwardly projecting compliant mounting shafts having inner ends affixed to a central portion of said base member, at least certain of said lubricating globules comprising quantities of solid lubricating material provided with, carried by, and cured-in-place in and on the surface of a body of matrix material, each globule comprising a plurality of successive cured-in-place matrix material layers forming a composite cured-in-place lubricating globule of virtually any desired size suitable for the intended lubricating usage thereof, at least certain ones of said mounting shafts comprising flexible nylon bristles.

7. A flexible lubricant applicator as defined in claim 1, wherein said lubricant means comprising said outer plurality of said spaced lubricating globules provided with and being affixed to said outer ends of said flexible compliant lubricant mounting means takes the form of a corresponding plurality of flexible outwardly projecting compliant mounting shafts having inner ends affixed to a central portion of said base member, at least certain of said lubricating globules comprising quantities of solid lubricating material in particulate form to comprise lubricating particles provided with, carried by, and cured-in-place in and on the surface of a resinoid body of matrix material, each globule comprising a plurality of successive cured-in-place matrix material layers forming a composite cured-in-place lubricating globule of virtually any desired size suitable for the intended lubricating usage thereof, at least certain ones of said mounting shafts comprising flexible nylon bristles, said particles of solid lubricating material comprising carbon particles of the graphite type.

8. A flexible lubricant applicator as defined in claim 1, wherein said lubricant means comprising said outer plurality of said spaced lubricating globules provided with and being affixed to said outer ends of said flexible compliant lubricant mounting means takes the form of a corresponding plurality of flexible outwardly projecting compliant mounting shafts having inner ends affixed to a central portion of said base member, at least certain of said lubricating globules comprising quantities of solid lubricating material in particulate form to comprise lubricating particles provided with, carried by, and cured-in-place in and on the surface of a resinoid body of matrix material, each globule comprising a plurality of successive cured-in-place matrix material layers forming a composite cured-in-place lubricating globule of virtually any desired size suitable for the intended lubricating usage thereof, at least certain ones of said mounting shafts comprising flexible nylon bristles, said particles of solid lubricating material comprising particles of teflon polytetrafluoroethylene material.

9. A flexible lubricant applicator as defined in claim 1, wherein said lubricant means comprising said outer longitudinally and circumferentially spaced plurality of said spirally arranged lubricating globules provided with and being affixed to said outer ends of said flexible compliant lubricant mounting means takes the form of a corresponding plurality of flexible outwardly projecting compliant mounting shafts having inner ends affixed to a central portion of said base member and thus compositely comprising a flexible lubricating brush, at least certain of said lubricating globules comprising quantities of solid lubricating material in particulate form to comprise lubricating particles provided with, carried by and cured-in-place in and on the surface of a resinoid body of matrix material taking the form of an epoxy resin, each globule comprising a plurality of successive cured-in-place matrix material layers forming a composite cured-in-place lubricating globule of virtually any desired size suitable for the intended lubricating usage thereof, said particles of solid lubricating material comprising carbon particles of the graphite type.

10. A flexible lubricant applicator as defined in claim 1, wherein said lubricant means comprising said outer longitudinally and circumferentially spaced plurality of said spirally arranged lubricating globules provided with and being affixed to said outer ends of said flexible compliant lubricant mounting means takes the form of a corresponding plurality of flexible outwardly projecting compliant mounting shafts having inner ends affixed to a central portion of said base member and thus, compositely comprising a flexible lubricating brush, at least certain of said lubricating globules comprising quantities of solid lubricating material in particulate form to comprise lubricating particles provided with, carried by, and cured-in-place in and on the surface of a resinoid body of matrix material taking the form of an epoxy resin, each globule comprising a plurality of successive cured-in-place matrix material layers forming a composite cured-in-place lubricating globule of virtually any desired size suitable for the intended lubricating usage thereof, said particles of solid lubricating material comprising particles of teflon polytetrafluoroethylene material.

* * * * *